(12) United States Patent
Reboullet

(10) Patent No.: US 7,228,760 B2
(45) Date of Patent: Jun. 12, 2007

(54) CYCLE PEDAL WITH ADJUSTABLE AXIAL POSITIONING

(75) Inventor: Olivier Reboullet, Loriol (FR)

(73) Assignee: Look Cycle International, Nevers (FR)

( * ) Notice: Subject to any disclaimer, the term of this patent is extended or adjusted under 35 U.S.C. 154(b) by 554 days.

(21) Appl. No.: 10/614,038

(22) Filed: Jul. 8, 2003

(65) Prior Publication Data

US 2005/0274220 A1 Dec. 15, 2005

(30) Foreign Application Priority Data

Jul. 8, 2002 (FR) .................................. 02 08523

(51) Int. Cl.
*G05G 1/14* (2006.01)
(52) U.S. Cl. .................................. 74/594.6
(58) Field of Classification Search ............... 74/594.4, 74/594.6, 594.7, 512, 560, 562.5; 36/130, 36/131; 411/166, 161, 188; 403/11, 12; 280/11.28
See application file for complete search history.

(56) References Cited

U.S. PATENT DOCUMENTS

| | | | | |
|---|---|---|---|---|
| 4,311,319 A | * | 1/1982 | Snyder et al. ........... 280/11.28 |
| 4,371,279 A | * | 2/1983 | Prussen et al. ................. 403/8 |
| 5,445,419 A | * | 8/1995 | Thuerig ........................... 285/1 |
| 5,765,450 A | * | 6/1998 | Kruger et al. .............. 74/594.6 |
| 5,778,739 A | * | 7/1998 | Takahama .................. 74/594.6 |
| 5,852,956 A | * | 12/1998 | Chen ........................... 74/594.6 |
| 5,964,809 A | * | 10/1999 | Lin et al. ..................... 264/257 |
| 6,014,914 A | * | 1/2000 | Ueda .......................... 74/594.6 |
| 6,085,614 A | * | 7/2000 | Lin ............................. 74/594.6 |
| 6,183,136 B1 | * | 2/2001 | Dingman .................... 384/204 |
| 6,205,885 B1 | * | 3/2001 | Hermansen et al. ....... 74/594.6 |
| 6,230,583 B1 | * | 5/2001 | Ohno ......................... 74/594.6 |
| 6,244,136 B1 | * | 6/2001 | Chen ........................... 74/594.6 |
| 6,393,940 B1 | * | 5/2002 | Ueda .......................... 74/594.6 |
| 6,446,529 B1 | * | 9/2002 | Tanaka ....................... 74/594.6 |
| 6,490,948 B2 | * | 12/2002 | Tanaka ........................ 74/594 |

FOREIGN PATENT DOCUMENTS

| | | |
|---|---|---|
| EP | 1 170 203 | 1/2002 |
| FR | 2 793 763 | 11/2000 |

* cited by examiner

*Primary Examiner*—Richard Ridley
*Assistant Examiner*—Matthew A. Johnson
(74) *Attorney, Agent, or Firm*—Young & Thompson

(57) ABSTRACT

The pedal comprises a pedal body having hooks, and a cartridge containing a pedal axle and which is received in a transverse recess of the pedal. This recess is provided with a tapping coacting with a screw, thread on the cartridge to permit the continuous adjustment of the transverse position of this latter, and holding elements of the cartridge in a transverse position. The holding elements comprise a ring for blocking in rotation the cartridge adapted to be connected to the cartridge by positive locking members provided on one end of the latter and positive locking members provided on the ring. Gripping elements are provided to grip the ring against the cartridge.

16 Claims, 2 Drawing Sheets

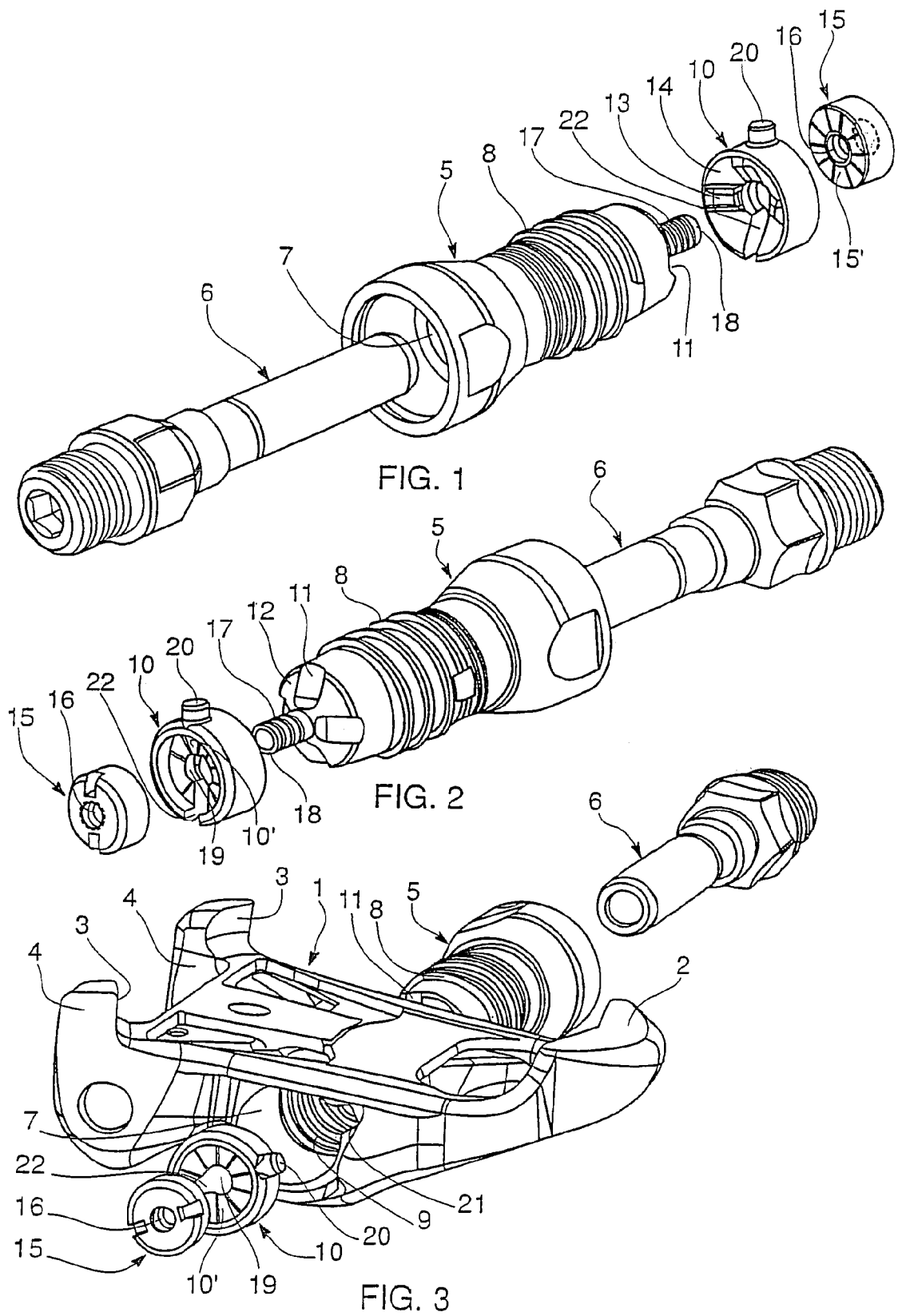

CYCLE PEDAL WITH ADJUSTABLE AXIAL POSITIONING

FIELD OF THE INVENTION

The present invention relates to automatic pedals with adjustable positioning of the pedal on the pedal axle, and more particularly roadway pedals, but also all terrain pedals.

BACKGROUND OF THE INVENTION

A pedal of this type comprises a pedal body having engagement members of a hooking element fixed below the cyclist's shoe, and a pedal axle adapted to be fixed to a pedal crank.

There are known automatic pedals of this type permitting the adjustment of the positioning of the bearing surface of the foot during pedaling. A first adjustment permits moving transversely along the pedal axle the bearing surface of the foot on the pedal relative to the pedal crank to bring the foot as close as possible to this latter without touching it or to space it from the latter. A second adjustment can be provided so as to permit modifying the angle of inclination of the pedal body relative to the pedal axle.

An automatic pedal permitting these adjustments is known from French patent application 99 06274 of the applicant. The pedal body carries a socket forming a seat for a metallic cartridge in which, the pedal axle is disposed. For adjustment of the transverse position of the axle, a circular rib on the cartridge is adapted to coact with one from among several circular grooves arranged in the socket. These circular grooves are disposed one after the other so as to define successive transverse positions of the axle relative to the pedal body. However, the adjustment means comprise a large number of complicated pieces of which certain ones are relatively fragile.

To overcome these drawbacks, the applicant in his French patent 2,811,287 (corresponding to U.S. Pat. No. 6,564,676 and EP 1,170,203) proposes simplified adjustment means. The cartridge containing the pedal axle is provided with a screw thread adapted to coact with a tapping in the overall cylindrical recess of the cartridge. The transverse position of the cartridge, and hence of the pedal body, relative to the pedal crank, can also be adjusted by screwing or unscrewing the cartridge in its recess.

This recess is moreover provided in a resiliently deformable support which is slotted adjacent the recess and which can be fixed with the help of securement screws against the lower surface of the pedal body properly so called, so as to hold the cartridge in a selected transverse position by gripping the internal wall of the recess about the cartridge by resilient deformation.

Even if this pedal is generally satisfactory, it nevertheless has several drawbacks. More precisely, it has been seen that in practice, this construction is not entirely reliable as to holding in place the cartridge in its recess. This is due to the fact that the support comprising the recess of the cartridge is of deformable plastic material, which can give rise to a certain flow of this material under mechanical stress due to the gripping of the securement screws and as a result the impairment of the holding function.

SUMMARY OF THE INVENTION

The invention has for its object to overcome these drawbacks by proposing a pedal provided with adjustment means of the transverse position of the cartridge which will be absolutely reliable as to the holding in place of this latter in the selected position and which moreover permits the use of a cartridge of plastic material. These holding means according to the invention are particularly simple to use and permit at the same time the easy and simple adjustment of the transverse position of the cartridge.

The invention has for its object an automatic cycle pedal comprising a pedal body carrying engagement members with a hooking member fixed below a cyclist's shoe and a cylindrical cartridge containing a pedal axle adapted to be fixed to a pedal crank, said cartridge being received in a transverse cylindrical recess of the pedal, this cylindrical recess being provided with tapping coacting with screw threads on the cartridge to permit the continuous adjustment of the transverse position of the latter, and holding means for the cartridge in a selected transverse position, characterized by the fact that said holding means comprise an element for blocking in rotation the axially displaceable cartridge in said recess and adapted to be connected to said cartridge by a first positive locking means provided on an end of this latter and second positive locking means provided on said blocking element, and gripping means adapted to grip the blocking element in rotation, against said cartridge to place said first and second positive locking means in engagement with each other.

According to other characteristics of the invention:

said element for blocking the cartridge in rotation comprises a blocking member in rotation relative to said recess;

said blocking member in rotation comprises at least one radial lug provided on the periphery of the blocking element in rotation and extending into an axial groove provided on the internal wall of said recess;

said blocking member in rotation is constituted by the non-circular shape of the periphery of said blocking element in rotation which is complementary to the non-circular shape of an end zone of said recess;

said gripping means comprise a screwing element comprising a first screw thread adapted to coact with a second screw thread within the recess to grip said blocking element in rotation against said cartridge;

said first screw thread is constituted by threading of a nut forming said screwing element, and said second screw thread is constituted by an external screw thread on a central rod at the end of the cartridge extending through a central hole of said element for blocking in rotation;

said first screw thread is constituted by an external screw thread on a cylindrical screwing element, and the second screw thread is constituted by threading in an end region of said recess;

said first and second toothed engaging means have complementary conical surfaces, and said element for blocking in rotation is formed by a resilient split ring, such that the periphery of said ring will be urged toward the internal wall of said recess when said element for blocking in rotation is gripped against said cartridge;

said first and second toothed engagement means comprise complementary ribs and grooves;

said ribs and grooves have a rounded cross-section;

the screwing element as well as the element for blocking in rotation comprise respective notches provided on the facing surfaces so as to prevent the spontaneous unscrewing of the screwing element during use of the pedal.

BRIEF DESCRIPTION OF THE DRAWINGS

Other characteristics and advantages of the invention will become apparent from the following description of one embodiment of the invention, this description being given by way of non-limiting example with reference to the accompanying drawings, in which:

FIG. 1 is an exploded perspective view of a cartridge provided with means for holding in place according to the invention;

FIG. 2 corresponds to FIG. 1, turned in the other direction;

FIG. 3 is a perspective view, partially exploded, of a pedal according to the invention;

DETAILED DESCRIPTION OF THE INVENTION

Figure 4:
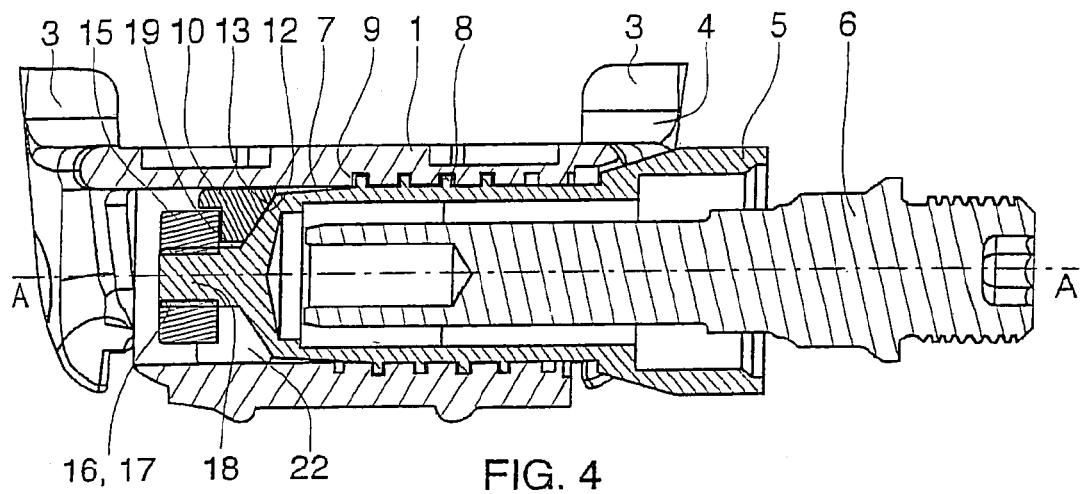
FIG. 4 is a transverse cross-sectional view of the pedal according to the invention showing the pedal body at a minimum distance relative to the pedal crank.

With reference to FIG. 3, the pedal comprises a pedal body 1 having engagement members with a hooking element (not shown) fixed below a cyclist's shoe (not shown). These engagement members comprise in a known manner a front fixed hook 2 and two rear movable hooks 3 formed on a respective lever 4 urged toward the engagement position by resilient elements constituted by torsion springs (not shown).

The pedal body moreover carries an elongated element in the form of a cartridge 5 in which a pedal axle 6 is rotatably mounted with the help of a roller bearing (not shown).

The pedal body 1 is provided with a transverse through hole of cylindrical shape forming a recess for the cartridge 5.

For the adjustment of the transverse position of the pedal body 1, and accordingly of the bearing surface for the foot, along the pedal axis A-A (see FIG. 4), the cartridge 5 is provided with a screw threading 8 adapted to coact with a threading 9 provided on the internal wall of the recess 7 in the pedal body 1.

Thanks to this arrangement, it is possible to carry out a continuous adjustment of this transverse position of the cartridge and as a result of the pedal body. The screw pitch is such that it gives a range of adjustment corresponding preferably to about 10 mm, permitting an adjustable positioning of 50 to 60 mm from the median longitudinal axis of the pedal body 1 to the external surface of the crank.

Figure 5:
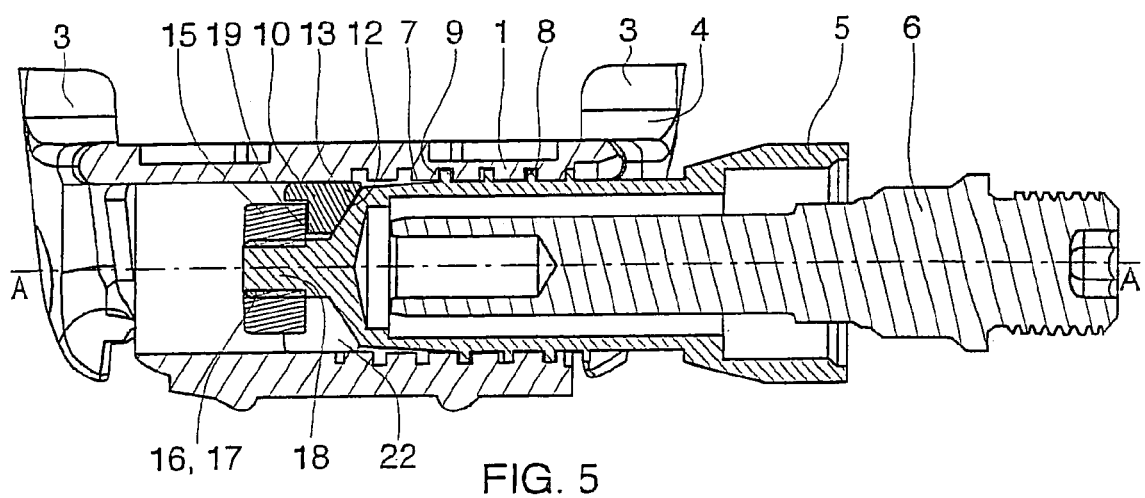
FIG. 5 is a transverse cross-sectional view of the pedal according to the invention showing the pedal body at a maximum distance relative to the pedal crank.
Figure 6:
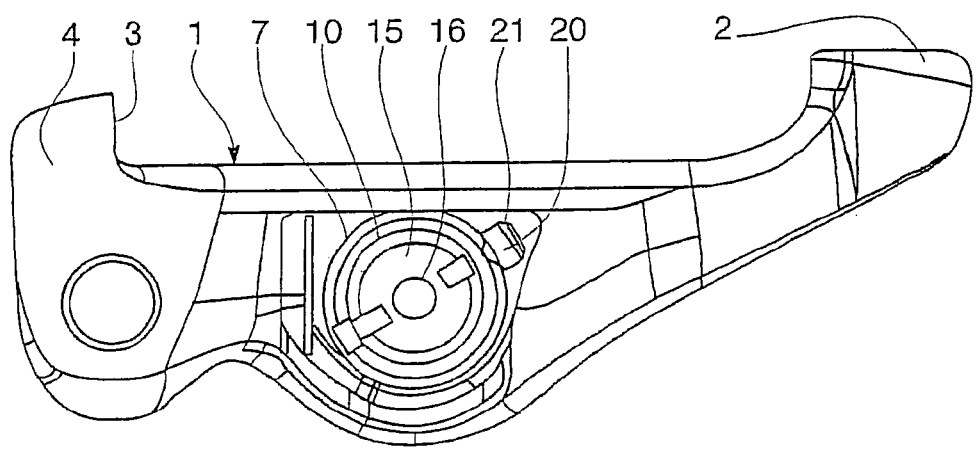
FIG. 6 is a side view of a pedal according to the invention.

The cartridge 5 can thus be moved axially between the position of minimum distance from the drive shown in FIG. 4 to the position at a maximum distance shown in FIG. 5.

Following this adjustment, it is important that the cartridge be firmly held in place in the recess, and to this end the holding means comprise, according to the invention, an element 10 for blocking in rotation the cartridge in the recess 7. This blocking in rotation element comprises a member for blocking in rotation which will be described in detail later.

In the illustrated example, the element for blocking in rotation has the shape of a ring 10 axially movable in the recess 7 and adapted to be connected to the cartridge 5 by positive locking means. These positive locking means comprise first positive locking means 11 in the form of ribs, provided on a convex conical surface 12 at the end of the cartridge 5, and second positive locking means 13 in the form of grooves provided on a conical concave surface 14 in the ring 10.

The conical surfaces 12, 14 are complementary and the grooves 11 and ribs 13 are also complementary and have preferably a rounded cross-section to facilitate starting the adjustment.

In the illustrated example, the grooves 11 and ribs 13 are four in number, regularly spaced from each other. Of course, they could be of a number of for example six or eight, which would permit even finer adjustment.

The pedal is also provided with gripping means adapted to grip the ring 10 against the cartridge 5 to place the ribs 13 in the grooves 11 in engagement with each other.

According to the embodiment shown in the figures, these gripping means comprise a screwing element in the form of a nut 15 whose threading 16 constitutes a first screw thread adapted to coact with a second screw thread in the form of screw threading 17 on a central rod 18 at the end of the cartridge 5. This central rod 18 passes through a central hole 19 of the ring 10 to coact with the nut 15 so as to grip the ring against the end of the cartridge to place the toothed engagement means in engagement.

According to a modification not shown in the drawings, a first screw thread is constituted by an external screw thread on a cylindrical screwing element, whilst a second screw thread is constituted by a tapping in an end zone of the recess 7. This has the advantage that the screwing element constitutes at the same time a plug and it becomes practically impossible to be lost because it will never be entirely unscrewed from the recess 7.

As already mentioned, the ring 10 comprises a member for blocking in rotation relative to the recess 7. In the embodiment illustrated in the drawings, this member for blocking in rotation comprises at least one radial lug 20 provided on its periphery and extending in an axial groove 21 provided on the internal wall of the recess 7.

According to a modification not shown in the drawings, the member for blocking in rotation is quite simply constituted by a non-circular shape of the periphery of the element for blocking in rotation which is complementary to a non-circular shape of an end region of the recess 7. This non-circular shape can be oval, hexagonal or the like.

In the embodiment shown in the drawings, the ring 10 is a split ring having a slot 22 extending from the central hole 19 to the periphery of the ring. In this case, the ring is of a slightly flexible plastic material such that when it is gripped against the cartridge 5, the conical surfaces 12, 14 of these two elements will produce a wedging effect which will press back the periphery of the ring against the internal wall of the recess 5 so as to take up any play between the facing surfaces and at the same time securely to fix the ring within the recess.

Moreover, to improve the retention of the screwing element against the element for blocking in rotation, and more particularly the nut 15 against the ring 10, these two elements are on their facing surfaces preferably provided with respective notches 15', 10' which during gripping of the nut enter into contact with each other to prevent spontaneous unscrewing of the nut 15 during use of the pedal. Of course, these notches 10', 15' can also be provided on a cylindrical screwing element such as mentioned above.

Thanks to the invention, there is thus obtained a pedal permitting easy adjustment of the lateral position of the pedal body, and this with the help of extremely simple, reliable and inexpensive means. Moreover, the invention also permits the use of a cartridge of plastic material.

The invention claimed is:

1. Automatic cycle pedal comprising:
a pedal body (1) having engagement members (2, 3) with a hooking element fixed below a cyclist's shoe and a cylindrical cartridge (5) containing a pedal axle (6) adapted to be fixed to a drive crank, said cartridge (5) being received in a cylindrical transverse recess (7) of the pedal, said recess being open at both ends,
the cylindrical recess having threading (9) coacting with screw threading on the cartridge (5) to permit the continuous adjustment of the transverse position of the cartridge in the recess between two operating positions,
a blocking element for blocking rotation (10) of the cartridge (5), the blocking element being axially displaceable in said recess (7) and adapted to be connected to said cartridge (5) by a first positive locking means (11) on an end of said cartridge and a second positive locking means (13) on said blocking element (10), and
a lock nut threaded onto further threading on said cartridge and accessible through the other of said ends of said recess, said lock nut having a loose position that permits transverse movement of said cartridge between said two operating positions and a tight position that engages said first and second positive locking means with each other to prevent transverse movement of said cartridge in said recess.

2. Pedal according to claim 1, wherein said first and second positive locking means (11, 13) have complementary conical surfaces (12, 14), and said blocking element (10) comprises a resilient split ring that is urged open toward an internal wall of said recess (7) by movement of said lock nut to the tight position.

3. Pedal according to claim 1, wherein the tight position of said lock nut holds said cartridge in a further operating position in said recess that is between said two operating positions.

4. Pedal according to claim 1, wherein said first and second positive locking means (11, 13) comprise complementary ribs (13) and grooves (11).

5. Pedal according to claim 4, wherein said ribs (13) and grooves (11) have a rounded crosssection.

6. Pedal according to claim 1, wherein said blocking element comprises a member (20) for blocking rotation of said blocking element relative to said recess (7).

7. Pedal according to claim 6, wherein said member (20) comprises at least one radial lug provided on a periphery of said blocking element (10) and extending in an axial groove (21) in an internal wall of said recess (7).

8. Pedal according to claim 6, wherein said member is constituted by a noncircular shape of a periphery of said blocking element (10) which is complementary to a noncircular shape of an end zone of said recess (7).

9. An automatic cycle pedal comprising:
a pedal body (1) having shoe engagement members (2, 3) and a threaded cylindrical transverse recess (7) open at both ends;
a cylindrical cartridge (5) containing a pedal axle (6), said cartridge (5) being received in one of said ends of said cylindrical transverse recess and having threading coacting with the threading of said recess for adjustment of a transverse position of said cartridge in said recess between two operating positions;
a blocking element (10) that is axially displaceable in said recess and blocks rotation of said cartridge in said recess to hold said cartridge in a transverse position in said recess;
a first positive lock (11) on an end of said cartridge and a second positive lock (13) on said blocking element; and
a lock nut threaded onto further threading on said cartridge and accessible through the other of said ends of said recess, said lock nut having a loose position that permits transverse movement of said cartridge between said two operating positions and a tight position that engages said first and second positive locks with each other to prevent transverse movement of said cartridge in said recess.

10. The pedal of claim 9, wherein said blocking element is an expandable split ring.

11. The pedal of claim 9, wherein said first and second positive locks comprise complementary convex and concave parts that mesh to stop relative rotation of said blocking element and said cartridge when said first and second positive locks are placed in engagement with each other by said lock nut.

12. The pedal of claim 9, wherein the threading of said recess is an internal threading and the threading of said cartridge is complementary external threading.

13. The pedal of claim 9, wherein the tight position of said lock nut holds said cartridge in a further operating position in said recess that is between said two operating position.

14. The pedal of claim 9, wherein said blocking element comprises means for blocking rotation of said blocking element relative to said recess.

15. The pedal of claim 14, wherein said means for blocking comprises a radial lug on a periphery of said blocking element that extends into an axial groove in an internal wall of said recess.

16. The pedal of claim 14, wherein said means for blocking comprises a non-circular shape of a periphery of said blocking element and a complementary a non circular shape of an end of said recess.

* * * * *